United States Patent [19]
Wattron et al.

[11] Patent Number: 5,347,681
[45] Date of Patent: Sep. 20, 1994

[54] RELEASABLE FIFTH WHEEL CASTER FOR SKATEBOARDS

[75] Inventors: James P. Wattron, 2000 Pine St., Apt. 10, Waukegan, Ill. 60087; Walter E. Lisowski, Chicago, Ill.

[73] Assignee: James P. Wattron, Waukegan, Ill.

[21] Appl. No.: 12,728

[22] Filed: Feb. 3, 1993

[51] Int. Cl.⁵ .................... A63C 17/01; B60B 33/00
[52] U.S. Cl. ............................. 16/30; 16/38; 16/39; 280/11.27; 280/87.042
[58] Field of Search ............... 16/30, 38, 39; 280/11.27, 11.19, 87.042; 81/177.85

[56] References Cited

U.S. PATENT DOCUMENTS

| | | | |
|---|---|---|---|
| 162,433 | 4/1875 | Thinnes et al. | 16/38 |
| 438,506 | 10/1890 | Thinnes | 16/38 |
| 1,461,767 | 7/4923 | Weyrauch | 16/39 |
| 2,430,737 | 11/1947 | Roe | 16/39 |
| 2,520,375 | 8/1950 | Roe | 16/39 |
| 4,317,392 | 3/1982 | Stephens et al. | 81/177.85 |
| 4,636,135 | 1/1987 | Bancon | 81/177.85 |
| 4,848,196 | 7/1989 | Roberts | 81/177.85 |
| 5,221,111 | 6/1993 | Younger | 280/87.042 |

FOREIGN PATENT DOCUMENTS

| | | | |
|---|---|---|---|
| 189894 | 2/1938 | Switzerland | 280/11.27 |
| 3264 | of 1886 | United Kingdom | 16/38 |

Primary Examiner—Lowell A. Larson
Assistant Examiner—Donald M. Gurley
Attorney, Agent, or Firm—Leydig, Voit & Mayer, Ltd.

[57] ABSTRACT

A releasable fifth wheel for use with a skateboard having an upwardly sloped tail portion cantilevered out beyond the rear race which includes a caster with swivel connected yoke and stem with the yoke supporting a plastic wheel. The stem includes a manually operable spring biased rod that has an indentation between its ends and co-acts with a ball detent. A pair of threadably engageable shells with flanges at their outer ends are adapted to be received in an opening in the skateboard tail. One of the shells has an internal groove which cooperatively locks the ball detent or releases the ball when the rod is moved longitudinally or rotationally.

7 Claims, 3 Drawing Sheets

RELEASABLE FIFTH WHEEL CASTER FOR SKATEBOARDS

FIELD OF THE INVENTION

The present invention relates generally to skateboards, and more particularly, to a fifth wheel caster which may be affixed to an upraised tail portion of the skateboard.

BACKGROUND OF THE INVENTION

Skateboards have now been in use for many years both recreationally and in competitive events. With the advent of more modern materials used for the production of the boards, further versatility has been added such as the provision of an upwardly sloping tail portion cantilevered rearwardly beyond the rear race so that the skateboarder can shift a foot and place weight in the back to lift up the front end of the board, thereby riding only on the rear race. Such action requires a greater degree of dexterity and balance which relatively few may be able to achieve. If the board is raised too high the tail end may tip back to the ground which can result in either the board shooting out from under the feet of the rider or frictionally breaking the forward motion of the board.

It has already been proposed that a fifth wheel caster could be affixed to the upwardly sloping tail portion as a way to overcome the problems of requiring delicate balance capability or avoiding frictional ground impact, however, permanently affixed fifth wheel casters required special capabilities and tools for installation as well as impacting the flexibility of being able to choose between use of the board with or without the additional wheel.

The present invention is directed toward overcoming one or more of the problems discussed above by providing a fifth wheel caster apparatus with an easy releasable attachment mechanism which may be simply and easily installed on the upwardly sloping tail end of a skateboard and minimizes the time and effort to install or release the caster wheel while maintaining the integrity of the skateboard.

Other objects and advantages of the invention will be apparent from the following detailed description.

SUMMARY OF THE INVENTION

In accomplishing this and other objects of the invention, there is provided a caster with swivel connected yoke and stem. The yoke carries a wear resistant plastic wheel such as those made of polyurethane materials. Included in the stem is a rod means that can be moved either longitudinally or rotationally with respect to the stem. The rod means has an indentation means which acts in conjunction with a ball detent either holding the ball radially outward or allowing the ball to move radially inward to the rod indentation. A pair of threadably engageable shells, inner and outer, with flanges at their opposite ends are received in an opening provided in the skateboard tail and threadably engaged together. One of the shells has an internal annular groove.

The caster stem is insertable from the bottom into the lower shell and either pushing the rod means preferably from the underside of the yoke or otherwise moving the rod means from a first position releases the ball detent to allow a telescoped fit and when the rod means is moved to a second position the ball detent is positively seated in the shell groove fixedly attaching the caster to the skateboard. Reversal of the procedure, that is, pushing or moving the rod means releases the ball detent and allows the caster to be simply removed from the skateboard.

Figure 1:
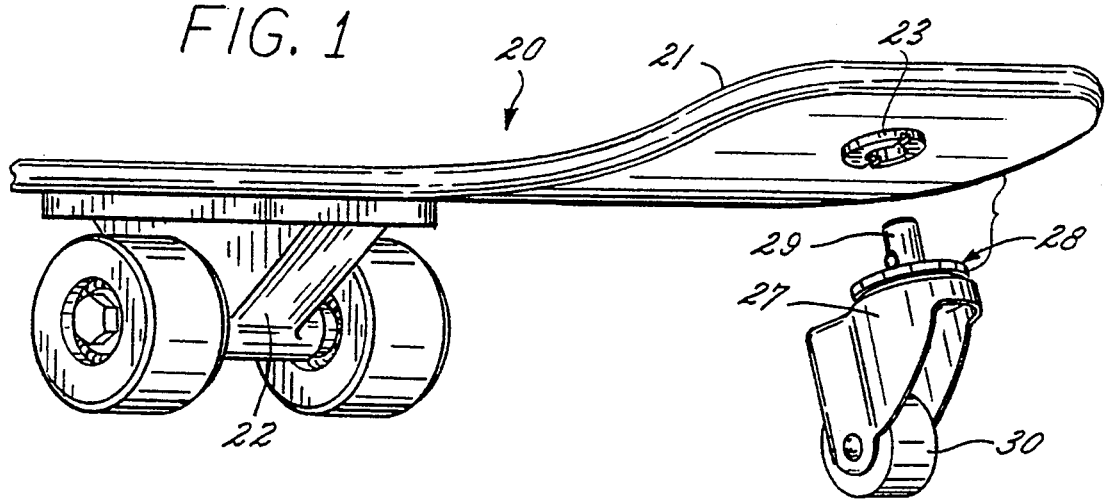
FIG. 1 is a partial rear side perspective view of the rear portion of a skateboard with the present invention positioned to be installed on the tail.

While the invention is susceptible to various alternative forms and modifications, specific embodiments thereof have been shown by way of example in the drawings and will herein be described in detail. It should be clear, however, that it is not intended to limit the invention to the particular forms disclosed, but on the contrary, the intention is to cover all modifications, equivalents, and alternatives falling within the scope and spirit of the invention as described in detail herein.

DETAILED DESCRIPTION OF THE INVENTION

Referring to the drawings, in particular, FIG. 1 illustrates an exemplary embodiment of the invention when used in connection with a skateboard generally indicated at 20, which is of the type having an upwardly slopping tail portion 21 extending outwardly over the rear wheel race 22 typically mounted to the board.

In the illustrative embodiment in FIG. 1, the tail portion 21 carries a flanged receiving sleeve 23 which is fixed together with a similar flanged receiving sleeve 24 (FIG. 2) that fit within a hole 25 provided in the board.

Figures 2, 3:
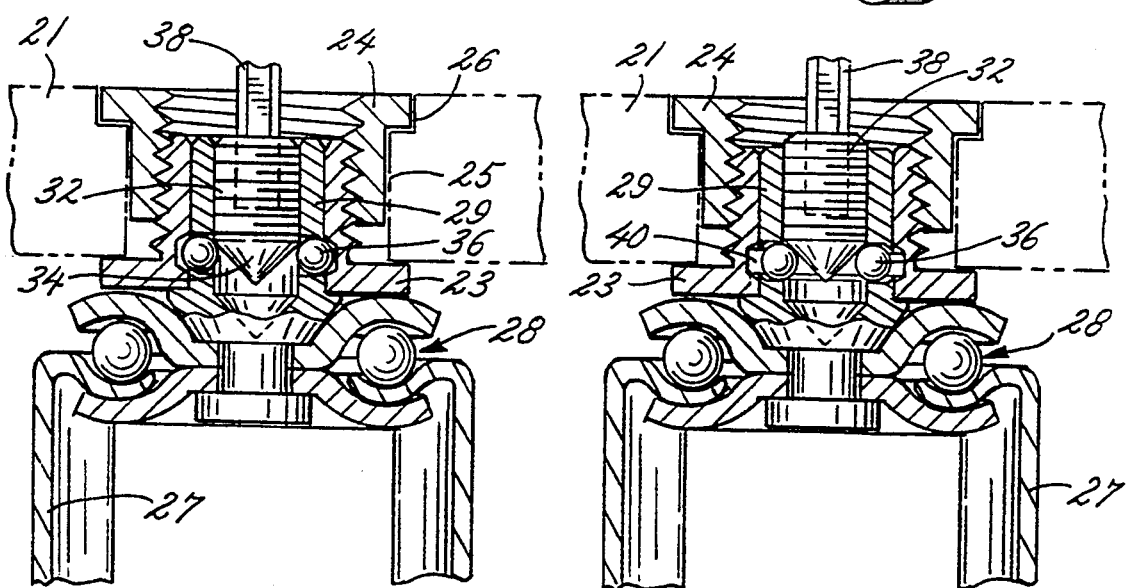
FIG. 2 is an enlarged partial section showing a top actuated release with an allen wrench, the rod member here shown in the actuated position.
FIG. 3 is an enlarged partial section similar to FIG. 2 here showing the release position.

As best shown in FIGS. 2 and 3, the flanged sleeves 23 and 24 are in the form of respective outer threaded and inner threaded shells which can be inserted in opening 25 through opposite sides of the skateboard tail 21 and threadably engaged together to firmly affix them to the skateboard. A counter bore 26 in opening 25 may be provided at the top so that the upper shell flange is seated evenly with the top surface of the skateboard.

In accordance with the present invention there is provided a caster having a wheel supporting yoke 27 connected with a ball bearing swivel 28 to a stem 29. The yoke 27 carries a wear resistant plastic wheel 30 such as those made of polyurethane materials and is approximately an inch and a quarter in diameter.

Figure 4:
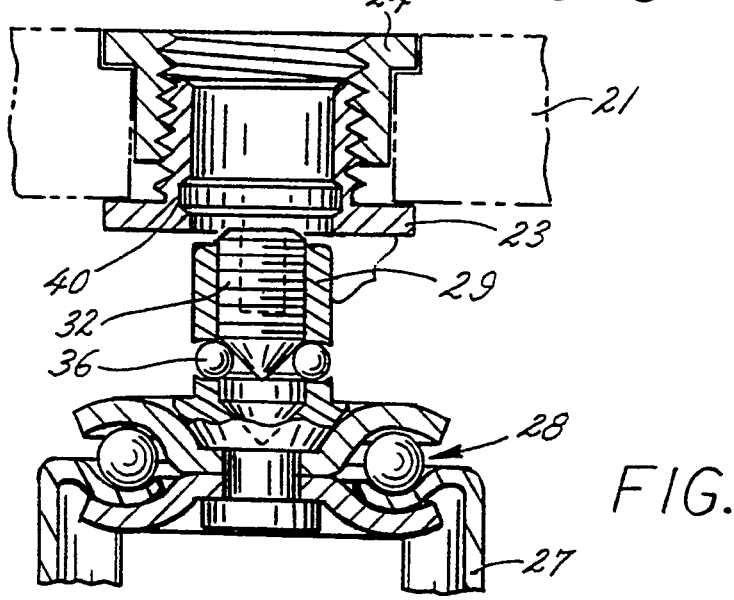
FIG. 4 is an enlarged section similar to FIGS. 2 and 3 here showing the removed wheel structure.

In carrying out the present invention, in one form, referring to FIGS. 2, 3 and 4 conjointly, the stem 29 carries a rod means here in the form of a threaded set screw 32 having a conical end 34 which engages with a pair of balls 36 disposed in radial openings in the stem 29 which upon threading the rod means set screw 32 downwardly by an allen wrench tool 38, spreads the balls outwardly to engage with a groove 40 which is here formed in the inner shell 23. Turning the rod means set screw in the opposite direction releases the balls 36 from the groove 40 such that the caster with the stem means 29 can be removed quickly and easily from the shells carried by the skateboard as shown in FIG. 4.

Figures 5, 6:
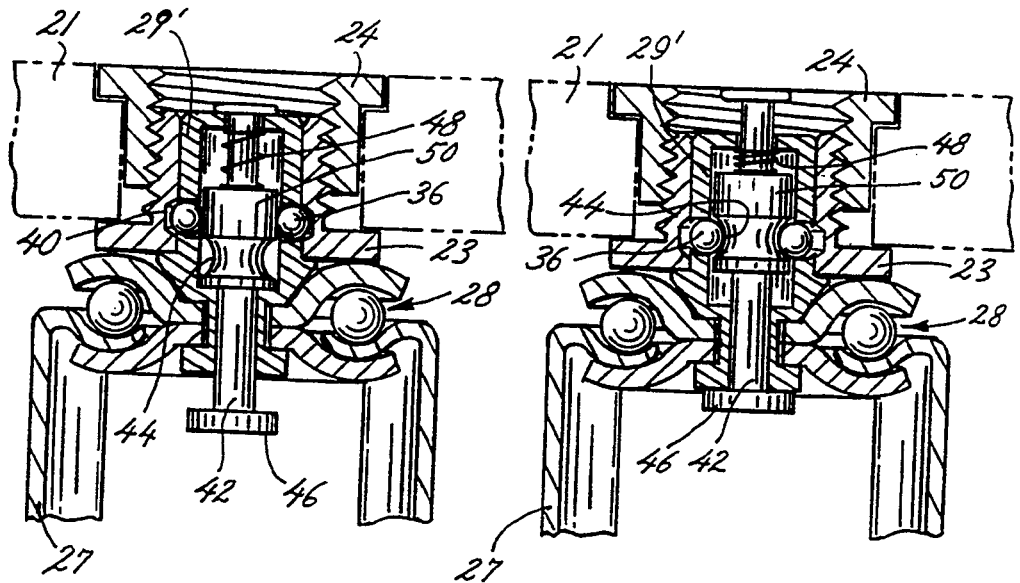
FIG. 5 is an enlarged partial section here showing a bottom actuated push-button release mechanism in the secure position.
FIG. 6 is an enlarged section similar to FIG. 5 here showing the release position.

Referring now to FIGS. 5 and 6, the caster stem means 29' again carries a pair of radially movable balls which act with groove 40 on shell 23, but with the rod means 42 here being in the form of a plunger having a grooved portion 44 intermediate its ends and a push-button head 46 at the lower end and a spring 48 at the upper end normally spring biases the rod means 42 downwardly. As shown in FIG. 5, the cylindrical portion 50 above the groove 44 of rod means 42 keeps the balls 36 radially outwardly engaged with the groove 40 which locks the stem 29 in place, holding the fifth wheel caster to the skateboard shells. As shown in FIG. 6, when the rod means is pushed upwardly against the spring 48, the grooved portion 44 of rod means 42 allows the balls 36 to move radially inward thereby releasing the stem means 29 for removal of the caster.

Figures 7, 8:
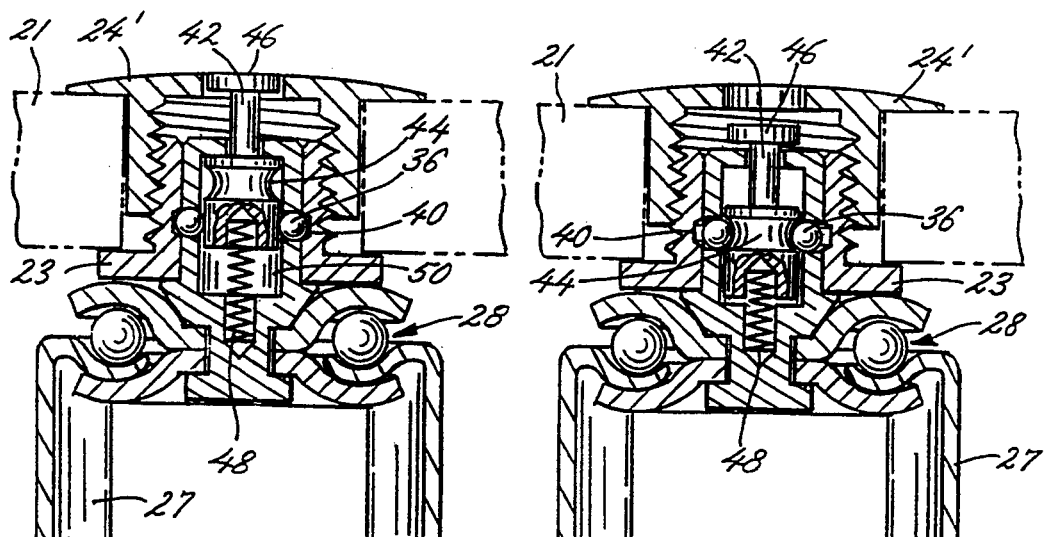
FIG. 7 is an enlarged partial section here showing an alternative push-button from the top in the secure position.
FIG. 8 is an enlarged partial section similar to FIG. 7 here showing the release position.

Turning now to FIGS. 7 and 8, an alternative arrangement is shown which is essentially the opposite of FIGS. 5 and 6 in that the rod means 42 push-button end 46 is at the top side and the grooved portion 44 and cylindrical portion 50 are likewise reversed. Also, the spring 48 is now at the lower end so that the push-button end 46 depressed from the top side releases the balls 36 so that the caster stem can be removed from the shells. Here, the upper flange of the top shell 24' has a tapered surface to confine the push-button 46 and assist in preventing inadvertent depression by the user standing on the board.

Figures 9, 10:
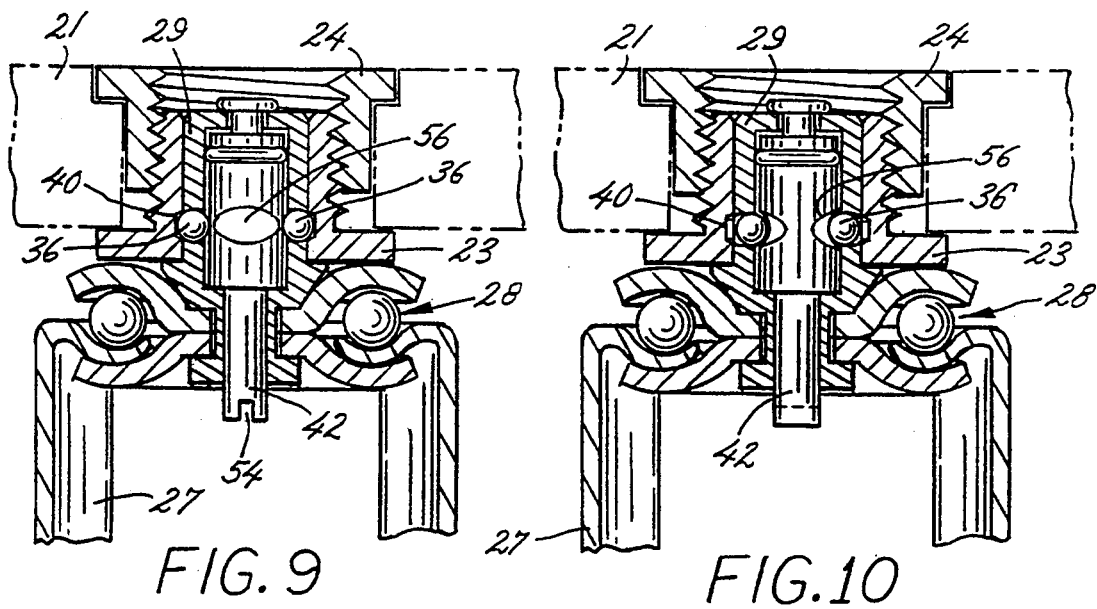
FIG. 9 is an enlarged partial section here showing an alternative twist release mechanism in the secure position.
FIG. 10 is an enlarged partial section similar to FIG. 9 here showing the release position.
Figure 11:
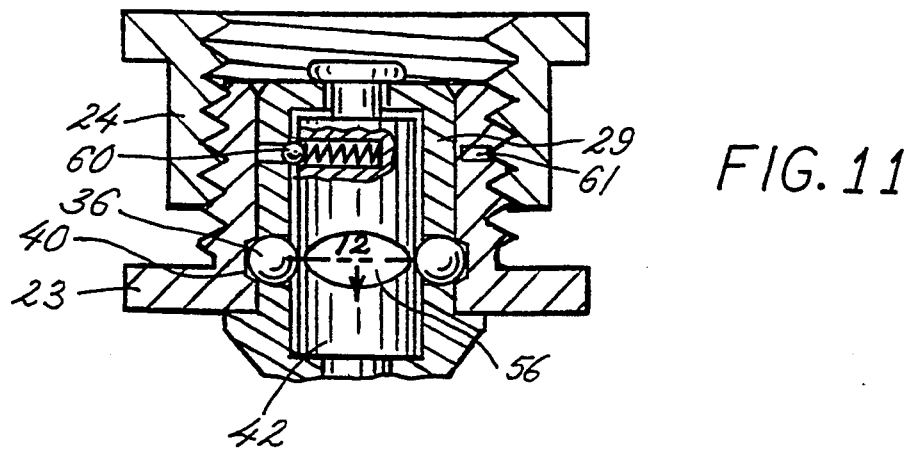
FIG. 11 is an enlarged partial section of the structure of FIGS. 9 and 10, including an additional position locating detent.

In yet another embodiment illustrated in FIGS. 9 and 10, rod means 42 projects downwardly and has a slotted end 54. Adjacent the radially movable balls 36 is a cylindrical portion and a grooved portion 56 on the surface of the rod means. Here, turning the rod means 42 so that the cylindrical portion engages the balls 36 will hold the balls 36 radially outward in the groove 40 of shell 23. As viewed in FIG. 10 when the rod means 42 is turned so that the grooved portions 56 are aligned with the balls 36, the latter can move radially inward and release the stem 29 with the attendant caster assembly. Referring to FIG. 11, there is shown a slightly modified arrangement such as in FIGS. 9 and 10, but with the addition of a staked ball spring biased detent 60 which in the present instance will indicate the locked-in place position of the turned rod means 42.

Figures 12, 13:
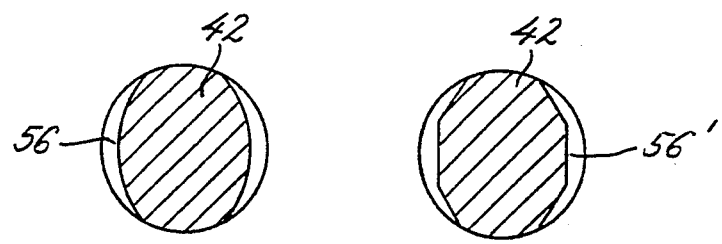
FIG. 12 is a section taken along the line 12—12 in FIG. 11, showing one cross-sectional cam profile.
FIG. 13 is a section view similar to FIG. 12 here showing an alternative cam profile with detent flats.

In order to insure that the sleeves 23, 24 do not come apart in use, a Nylon plug on patch 61 can be applied to either of the threaded surfaces. Alternatively, a U-shaped wedge can be cut in one or both of the flange edges and a pin or screw applied to arrest rotation. Liquid type sealants, like Thread-Loc can also be applied before screwing the parts together. In FIG. 12 there is shown a cross section of the rod means 42 indicating the grooved portion 56 which permits the radial inward movement of the balls 36. In FIG. 13, the grooved portion 56' is provided with lands including a flat at the central portion that provide a form of detent which does more positively indicate the unlocked turned position of the rod means 42.

As can be seen from the foregoing detailed description, the releasable fifth wheel caster assembly is extremely simple and economical to manufacture and use and can be adapted in a variety of ways to provide a more versatile skateboard.

It should be apparent to those skilled in the art that changes may be made in the shapes, dimensions and arrangements of the parts of the invention without departing from the principle thereof, the above setting forth only preferred forms of the invention.

We claim:

1. A releasable fifth wheel apparatus for use with a skateboard having an upwardly sloped tail portion and top and bottom surfaces, comprising:
   caster means including a wheel, support yoke, swivel and mounting stem means;
   inner and outer mutually engageable mounting shells adapted to be mounted together from the top and bottom surfaces in an opening provided on the skateboard tail portion;
   groove means provided on the inner one of said shells;
   opening means located on the stem means;
   radially movable ball means positioned between the groove means and opening means;
   said caster mounting stem means including manually operable means for moving said ball means radially to be engageable with said groove means so that operation of said manually operated means moves the ball means radially in the opening means to affix and release said caster with respect to said groove on the inner one of said shells.

2. A releasable fifth wheel apparatus as claimed in claim 1, wherein said manually operable means includes a spring biased rod means within the caster stem means which is normally biased downwardly and operable from the underside of the support yoke.

3. A releasable fifth wheel apparatus as claimed in claim 1, wherein said manually operable means includes a spring biased rod within the caster stem means normally biased upwardly and operable from the top surface mounted one of said mounting shells.

4. A releasable fifth wheel apparatus as claimed in claim 1, wherein said manually operable means is a spring biased rod means within the caster stem means and said ball means is movable radially by shifting of said rod means to engage with or disengage with said groove means of the inner one of said shells.

5. A fifth wheel apparatus as claimed in claim 1 wherein said outer and inner shells have flange means at their respective ends at the top and bottom surfaces of the skateboard and include respective inner and outer threaded surfaces for mutually engaging with one another.

6. A releasable fifth wheel apparatus as claimed in claim 1, wherein said manually operable means is a threaded member axially inserted in a threaded opening in said stem and co-acting with the radially movable ball means.

7. A releasable fifth wheel apparatus as claimed in claim 1 wherein said manually operable means a rod means rotationally twistable within the stem to coact with the radially inwardly and outwardly moveable ball means.

* * * * *